Patented Mar. 8, 1949

2,463,827

UNITED STATES PATENT OFFICE 2,463,827

PRODUCTION OF VISCOUS AQUEOUS SOLUTIONS OF PROTEINS

James E. L. Thomas and David Traill, Ardrossan, Scotland, assignors to Imperial Chemical Industries Limited, a corporation of Great Britain No Drawing. Application January 2, 1947, Serial No. 719,934. In Great Britain January 30, 1946

5 Claims. (Cl. 106—154)

The present invention relates to the production of viscous aqueous solutions of proteins, suitable for conversion into artificial filamentary products and is especially applicable to the production of highly concentrated stable and spinnable non-alkaline aqueous solutions of vegetable globulins, for instance, solutions of peanut globulins.

In making up aqueous alkaline solutions of vegetable globulins suitable for conversion into artificial filaments special difficulties are encountered occasioned in part by the difficulty of admixing homogeneously the alkaline solution of the required concentration with the aqueous suspension of the vegetable globulin in such a manner as to attain comparable viscosities in repeat operations, and by the necessity of permitting the aqueous alkaline solutions of vegetable globulins to mature or age under such conditions that a predetermined spinning viscosity will be obtained.

It is the object of the present invention to provide a method for the production of highly concentrated, stable aqueous solutions of vegetable globulins adapted for conversion into filamentary products by extrusion without the necessity of carrying out a previous ageing operation whereby the disadvantages of the prior art methods of preparing spinnable globulin solutions will be to a large extent avoided.

In an article entitled "Peanut protein hydrates" by R. S. Burnett in "Industrial and Engineering Chemistry" (Industrial Edition), September 1945, p.p. 861, it is disclosed that precipitated and filtered water wet peanut protein curds can be dewatered by warming until the curd particles coalesce and exude "unbound" water thereby reducing the water content of the protein from 70 to 80% to about 40% by weight and that similar "hydrates" can be prepared from isolated soybean protein. It is also stated that the curds obtained by precipitation at pH 5.0 differ from those obtained at pH 4.5 in that the water content of the former can be reduced readily by heating at 40 to 50° C. from 50 to 70% by weight to one corresponding to the bound water capacity of the protein amounting to about 42.5% by weight; while filtered protein curds precipitated at pH 4.5 can be dewatered only with difficulty by warming and kneading.

According to the present invention the method for the production of highly concentrated stable and spinnable aqueous solutions of vegetable globulins comprises incorporating into a plastic mass of about 60% peanut globulin content, separated by heating, with agitation to a temperature between 40 and 60° for a period of time at least sufficient for the globulins to collect into the said plastic mass at that temperature, an aqueous suspension of about 30% or less concentration of washed undried globulins that have been precipitated at their isoelectric region from solution, an alkali metal salt of an inorganic acid and in such quantity that there is formed in the water in the said mass an aqueous solution of the said salt of sufficient concentration to dissolve the vegetable globulins and thus form an aqueous saline protein solution in which the contents of the said globulins is about 60%.

The said alkali metal salt of an inorganic acid may be for example sodium chloride or sodium sulphate. The quantity incorporated is preferably not more than sufficient to form a ten per cent aqeuous solution of the salt in the amount of water present in the said separated mass.

It has been found that the highly concentrated stable aqueous solution of vegetable globulins thus formed can be extruded in filamentary form, preferably at a slightly elevated temperature, and that the filaments can be dry spun or coagulated in an acidified concentrated aqueous saline solution having included therein a soluble organic compound as, for example, ethyl alcohol or acetic acid, the amount of such organic compound being preferably not higher than 10% by weight.

The invention is illustrated by the following example, in which the parts are parts by weight:

Example

A peanut globulin mixture containing about 30% globulins and 70% water is prepared from peanut meal, already extracted with an organic solvent in the cold to remove the oil, by extraction with about 20 times weight of 0.15% sodium hydroxide solution, precipitation of the globulins from the filtered extract with sulphur dioxide at pH 5.0–5.2 and washing of the precipitate several times well with water followed by decantation and filtration.

The said peanut globulin mixture is heated in a vessel, placed on a water bath to about 55° C. as a result of which the protein changes in colour and physical form and while undergoing stirring at 55° C. for about one minute separates into a plastic mass containing about 60% protein by weight and a quantity of water. The water thus exuded is removed by decantation. The plastic mass has the consistency and texture of a firm dough at 50° C. and on cooling becomes more brittle and may be crumbled into small lumps.

3% of common salt is added to the plastic mass as a result of which it is converted into a viscous tacky semi-transparent material similar in consistency at room temperature to very thick tar. This semi-transparent material can be extruded through a spinneret at a temperature of 40° C. into a coagulating bath consisting of 200 gm. sodium sulphate, 15 gms. concentrated sulphuric acid, 100 gms. ethyl alcohol and 685 gms. water. The filaments thus formed can be subjected to any of the usual subsequent operations such as stretching, and hardening or insolubilisation with for example formaldehyde and the like compositions.

We claim:

1. A method for the production of stable, spinnable, aqueous, saline solutions of vegetable globulins which comprises obtaining a plastic mass of about 60% globulin content by heating an aqueous suspension of about 30% or less concentration by weight of washed undried vegetable globulins, that have been precipitated at their isoelectric region from solution, at a temperature between 40 and 60° C. for a period of time sufficient for the globulins to collect into a plastic mass, and rejecting the exuded water, and then incorporating into said plastic mass an alkali metal salt of a strong inorganic acid in such quantity that there is formed in the water retained in the said plastic mass an aqueous solution of the said salt of sufficient concentration to dissolve the vegetable globulins, said quantity not exceeding 10% by weight of said water, and thus form an aqueous saline protein solution in which the content of the said globulins is about 60% by weight.

2. A method as claimed in claim 1 wherein the said alkali metal salt of an inorganic acid is sodium chloride.

3. A method as claimed in claim 1 wherein the said alkali metal salt of an inorganic acid is sodium sulphate.

4. A method as claimed in claim 1 wherein said vegetable globulins are peanut globulins.

5. A stable, spinnable, non-alkaline, aqueous, saline solution of vegetable globulins of about 60% concentration by weight prepared in accordance with the process of claim 1.

JAMES E. L. THOMAS.
DAVID TRAILL.

REFERENCES CITED

The following references are of record in the file of this patent:

UNITED STATES PATENTS

| Number | Name | Date |
| --- | --- | --- |
| 1,280,862 | Satow | Oct. 8, 1918 |
| 2,310,221 | Denyes | Feb. 9, 1943 |
| 2,358,383 | Chibnall et al. | Sept. 19, 1944 |
| 2,394,308 | Kajita | Feb. 5, 1946 |
| 2,405,830 | Irving | Aug. 13, 1946 |